United States Patent
Kim et al.

(10) Patent No.: US 9,112,234 B2
(45) Date of Patent: Aug. 18, 2015

(54) CYLINDRICAL SECONDARY BATTERY OF IMPROVED SAFETY

(75) Inventors: Ji Young Kim, Seoul (KR); Jungjin Kim, Daejeon (KR); Kwan Soo Lee, Daejeon (KR); Sungjong Kim, Daejeon (KR); SooRyoung Kim, Chungcheongbuk-do (KR); Chahun Ku, Daejeon (KR); Dukhyun Ryu, Daejeon (KR); Byung kyu Jung, Daejeon (KR)

(73) Assignee: LG CHEM LTD., Seoul (KR)

( * ) Notice: Subject to any disclaimer, the term of this patent is extended or adjusted under 35 U.S.C. 154(b) by 111 days.

(21) Appl. No.: 13/292,784

(22) Filed: Nov. 9, 2011

(65) Prior Publication Data

US 2012/0114979 A1 May 10, 2012

Related U.S. Application Data

(63) Continuation of application No. PCT/KR2010/005338, filed on Aug. 13, 2010.

(30) Foreign Application Priority Data

Aug. 14, 2009 (KR) .................. 10-2009-0075156

(51) Int. Cl.
*H01M 2/12* (2006.01)
*H01M 10/04* (2006.01)
*H01M 2/34* (2006.01)

(52) U.S. Cl.
CPC ........ *H01M 10/0431* (2013.01); *H01M 2/1241* (2013.01); *H01M 2/345* (2013.01)

(58) Field of Classification Search
None
See application file for complete search history.

(56) References Cited

U.S. PATENT DOCUMENTS

| | | | |
|---|---|---|---|
| 5,609,972 A | | 3/1997 | Kaschmitter et al. |
| 5,879,832 A | * | 3/1999 | Vu et al. ................. 429/62 |
| 2004/0241536 A1 | * | 12/2004 | Kim ........................ 429/65 |
| 2007/0212595 A1 | * | 9/2007 | Kim et al. ............... 429/53 |
| 2009/0181301 A1 | * | 7/2009 | Kim et al. .............. 429/199 |

(Continued)

FOREIGN PATENT DOCUMENTS

| | | |
|---|---|---|
| CN | 102165624 B | 4/2014 |
| JP | 2005-108440 A | 4/2005 |
| JP | 2008-262832 A | 10/2008 |

(Continued)

OTHER PUBLICATIONS

International Search Report issued in PCT/KR2010/005338, dated Mar. 8, 2011.

*Primary Examiner* — Yoshitoshi Takeuchi
(74) *Attorney, Agent, or Firm* — Birch, Stewart, Kolasch & Birch, LLP (57) ABSTRACT

Provided is a cylindrical battery in which an electrode assembly fabricated by rolling a cathode/separator/anode and an electrolyte are provided in a cylindrical can, wherein a cap assembly mounted on the opening top of the cylindrical can comprises: a safety vent provided with a predetermined notch, to allow breakage due to high-pressure gas of the battery, a current interruptive device to interrupt current, welded to the bottom of the safety vent, and a gasket for the current interruptive device to surround the periphery of the current interruptive device, wherein the current interruptive device comprises two or more through holes to allow exhaustion of gas, wherein the through holes have a size of 20 to 50% with respect to the total area of the current interruptive device.

16 Claims, 9 Drawing Sheets

(56) References Cited

U.S. PATENT DOCUMENTS

2009/0311585 A1 12/2009 Muraoka et al.
2011/0008654 A1 1/2011 Kim et al.

FOREIGN PATENT DOCUMENTS

| | | | |
|---|---|---|---|
| KR | 10-2004-0037579 A | 5/2004 | |
| KR | 10-0619631 B1 | 9/2006 | |
| KR | 10-0855181 B1 | 8/2008 | |
| WO | WO 98/45887 A1 | 10/1998 | |
| WO | WO 2006/070546 A1 | 7/2006 | |
| WO | WO 2008/069476 * | 12/2006 | ............ H01M 2/34 |
| WO | WO 2007/105861 A1 | 9/2007 | |

* cited by examiner

CYLINDRICAL SECONDARY BATTERY OF IMPROVED SAFETY

CROSS REFERENCE TO RELATED APPLICATIONS

This application is a Continuation of International Application No. PCT/KR2010/005338 filed on Aug. 13, 2010, which claims priority under 35 U.S.C §119(a) to Patent Application No. 10-2009-0075156 filed in the Republic of Korea on Aug. 14, 2009, all which are hereby incorporated by reference into the present application.

TECHNICAL FIELD

The present invention relates to a cylindrical secondary battery. More specifically, the present invention relates to cylindrical battery in which an electrode assembly fabricated by rolling a cathode/separator/anode and an electrolyte are provided in a cylindrical can, wherein a cap assembly mounted on the opening top of the cylindrical can comprises: a safety vent provided with a predetermined notch, to allow breakage due to high-pressure gas of the battery, a current interruptive device to interrupt current, welded to the bottom of the safety vent, and a gasket for the current interruptive device to surround the periphery of the current interruptive device, wherein the current interruptive device comprises two or more through holes to allow exhaustion of gas, wherein the through holes have a size of 20 to 50% with respect to the total area of the current interruptive device.

BACKGROUND ART

Technological development and increased demand for mobile equipment have led to a rapid increase in the demand for secondary batteries as energy sources. Among these secondary batteries, a great deal of research associated with lithium secondary batteries having high energy density and discharge voltage is underway, and such a lithium secondary battery is commercially available and widely used.

Depending on the shape of the battery case, secondary batteries are divided into cylindrical batteries and angular batteries in which an electrode assembly is mounted in a cylindrical or angular metal can and pouch-type batteries in which an electrode assembly is mounted in a pouch-type case made of an aluminum laminate sheet. Of these, cylindrical batteries have advantages of relatively high capacity and structural stability.

An electrode assembly mounted in a battery case is a device for generating electricity which is rechargeable and dischargeable, and has a laminate structure of cathode/separator/anode. An electrode assembly is divided into a jelly-roll type electrode assembly fabricated by interposing a separator between a cathode having the shape of a long sheet, to which an active material is applied, and an anode, followed by rolling, and a stack-type electrode assembly fabricated by sequentially laminating a plurality of cathodes with a predetermined size and anodes with a predetermined size such that a separator is interposed between each cathode and each anode. Of these, the jelly-roll type electrode assembly has advantages of being easy to manufacture and having high energy density per weight.

Figure 1:
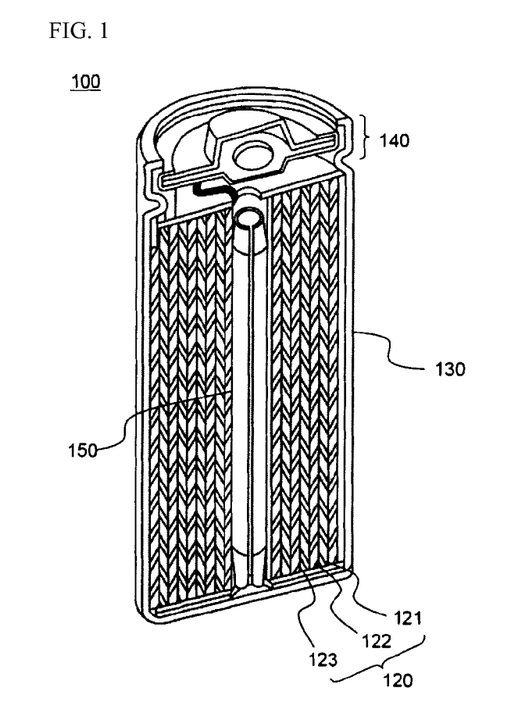
FIG. 1 is a cross-sectional perspective view schematically illustrating a general cylindrical battery.

In this regard, FIG. 1 is a cross-sectional perspective view schematically illustrating a general cylindrical battery.

Referring to FIG. 1, a cylindrical secondary battery 100 is fabricated by placing a jelly-roll type electrode assembly 120 in a cylindrical case 130, injecting an electrolyte into the cylindrical case 130 and connecting a top cap 140 provided with an electrode terminal (for example, a cathode terminal, not shown) to the opening top of the case 130.

The electrode assembly 120 has a structure in which a cathode 121, an anode 122 and a separator 123 interposed therebetween are rolled and a cylindrical center pin 150 is inserted into the rolling center thereof (the center of the jelly-roll). The center pin 150 is generally made of a metal material to provide a predetermined strength and has a hollow cylindrical structure in which a sheet material is circularly bent. The center pin 150 fixes and supports the electrode assembly and serves as a passage, allowing emission of gas generated due to an internal reaction upon charging/discharging.

Meanwhile, lithium secondary batteries have a disadvantage of low stability. For example, in the case where a battery is overcharged to about 4.5V or higher, a cathode active material is decomposed, lithium dendrites grow on an anode and an electrolyte is decomposed. These processes involve heat and decomposition reactions and a plurality of side-reactions thus rapidly proceed. Eventually, combustion and explosion of battery may occur.

Accordingly, in order to solve these problems, a general cylindrical secondary battery is provided with a current interruptive device (CID) and a safety vent to interrupt current, when the battery abnormally operates, and reduce an internal pressure in a space provided between an electrode assembly and a top cap.

Figure 2:
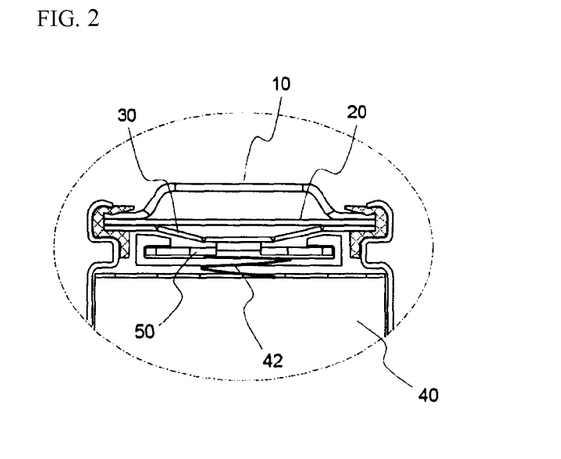
FIGS. 2 to 4 are cross-sectional views illustrating a series of processes in which current is interrupted and high-pressure gas is discharged by operation of a safety element in a conventional cylindrical battery.

This mechanism will be described with reference to FIGS. 2 to 4.

Referring to the drawings, the top cap 10 forms a cathode terminal in the form of a protrusion and is provided with a perforated vent. A positive temperature coefficient (PTC) element 20 which greatly increases battery resistance and thereby interrupts current when an internal temperature of the battery increases; a safety vent 30 which protrudes downwardly in a normal state, but protrudes and, at the same time, breaks, resulting in exhaust gas, when the internal pressure of the battery increases; and a connection plate 50, one side of the top of which is connected to the safety vent 30 and the other side of the bottom of which is connected to the cathode of the electrode assembly 40, are arranged under the top cap 10 in this order.

Accordingly, the cathode of the electrode assembly 40 is connected through a lead 42, the connection plate 50, the safety vent 30 and the PTC element 20 in this order to the top cap 10 under normal operation conditions, to apply electricity.

Figure 3:
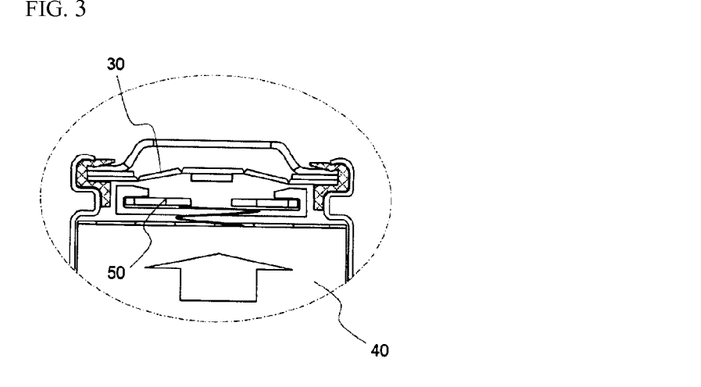
Figure 4:
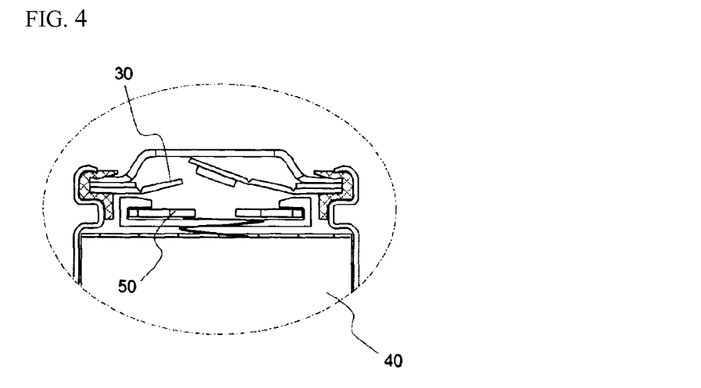

However, when gas is generated from the electrode assembly 40 due to, for example, overcharging, and an internal pressure is increased, as shown in FIG. 3, the shape of the safety vent 30 is inverted and thus protrudes upwardly. At this time, the safety vent 30 is separated from the connection plate 50 and current is thus interrupted. Accordingly, safety is secured in order to prevent further overcharging. Nevertheless, when the internal pressure continues to increase, as shown in FIG. 4, the safety vent 30 breaks, and the pressed gas passes through the broken region and is then exhausted through the vent of the top cap 10, thus preventing explosion of the battery.

Such an operation process depends on the amount of gas generated in the electrode assembly and efficiency of conveyance of the gas to the safety vent. For example, although a great amount of gas is generated, in the case where the gas is not efficiently transported to the safety vent, the desired safety operation process cannot proceed. Furthermore, unless a great deal of gas is generated within a short period of time, and the gas reaches the safety vent and induces a predetermined operation process, the internal pressure of battery rapidly increases, inducing explosion.

Further, generation of gas is induced by decomposition of the electrolyte via heat at high temperature. When heat generated from the batteries rapidly increases within a short period of time, thermal runaway may occur. The thermal runaway phenomenon occurs when a battery is in a continuous electricity application state. As the phenomenon further accelerates, the risk, that the battery may be combusted or exploded, considerably increases, thus disadvantageously causing a serious safety problem.

Accordingly, there is an increasing need for developing a cylindrical secondary battery which can more stably induce an internal gas of battery in a battery abnormal operation state and rapidly exhaust the gas to the outside of battery.

DISCLOSURE

Technical Problem

Therefore, the present invention has been made to solve the above problems and other technical problems that have yet to be resolved.

It is one object of the present invention to provide a secondary battery which allows a generated gas to be efficiently passed to safety members through a cap assembly having a specific structure and enables a predetermined safety process to proceed and thus ultimately improves battery safety.

It is another object of the present invention to provide a secondary battery, which induces a successive decomposition reaction of an electrolyte with an increase in temperature, inhibits a rapid increase in internal pressure of a battery and thus enables safety members to efficiently operate.

It is yet another object of the present invention to provide a secondary battery, which induces a decomposition reaction of an electrolyte, while minimizing generated heat and inhibits occurrence of thermal runaway.

Technical Solution

Accordingly, the cylindrical secondary battery according to the present invention is a cylindrical secondary battery in which a jelly-roll type electrode assembly fabricated by rolling a cathode/separator/anode and an electrolyte are provided in a cylindrical can, wherein a cap assembly mounted on the opening top of the cylindrical can comprises: a safety vent provided with a predetermined notch, to allow breakage due to high-pressure gas of the battery; a current interruptive device to interrupt current, welded to the bottom of the safety vent; and a gasket for the current interruptive device to surround the periphery of the current interruptive device, wherein the current interruptive device comprises two or more through holes to allow exhaustion of gas, wherein the through holes have a size of 20 to 50% with respect to the total area of the current interruptive device.

Accordingly, the cylindrical battery allows the generated gas to directly act on safety members through a cap assembly having a specific structure, induces the desired electricity interruption and enables the gas to be rapidly exhausted to the outside by rupturing the safety vent, thus securing battery safety.

The current interruptive device is a member which is broken and thus interrupts current, when an internal pressure of battery increases, and may have a structure in which a protrusion protruding upwardly and welded to the bottom of a recess of the safety vent is provided at the center thereof and a cathode lead connected to the cathode of the jelly-roll is electrically connected through the bottom of a region other than the protrusion.

As such, since the current interruptive device is connected to the safety member, a connection region between the current interruptive device and the cathode is broken according to the shape reversal of the safety vent, resulting in current interruption. In a specific example, a notch may be formed at the periphery surface of the protrusion, the notch breaks according to the shape reversal of safety vent and the protrusion may be easily separated from a connection region between the current interruptive device and the cathode, while the protrusion is still connected to the safety vent.

Further, the current interruptive device is provided with two or more through holes to allow gas to move upward, causing an increase in internal gas of battery and thus inverting the safety vent.

However, the present inventors confirmed that, in the case where an area of through holes provided at the current interruptive device is less than 20%, a battery combustion or explosion ratio increases when a high pressure is generated in the battery. This is believed to be due to the fact that efficient electricity interruption fails due to small amount of gas passing through the through holes or it takes for a long time to interrupt current due to blocking or variation of the upward movement passage of gas. Meanwhile, it is not preferable that the through holes have an excessively large size from the viewpoints that securing the predetermined strength and torsion of elements is difficult and torsion of components occurs upon processing Accordingly, in the cylindrical battery of the present invention, the current interruptive device comprises two or more through holes to allow gas exhaustion and the through holes have an area of 20 to 50%, more preferably, 30 to 40%, with respect to the total area of the current interruptive device to improve the amount of gas moved (exhausted) upwardly and induces rapid upward movement (exhaustion) of gas.

Preferably, the through holes are formed in the form of a circular arc at a radially symmetrical position, based on the center of the current interruptive device. In the case where the through holes are formed at such a radially symmetrical position, it is advantageous in that the concentration of gas exhaustion in one direction can be prevented and the strength of current interruptive device can be secured.

At this time, the number of through holes is not particularly limited and is preferably 2 to 4.

In a preferred embodiment, three through holes may be arranged such that they are spaced from one another by a predetermined distance in the form of a circular arc with a length corresponding to an angle of 50 to 80 degrees, based on the center of the current interruptive device.

Meanwhile, the protrusion is provided with a bridge, provided with three through holes and a notch to connect the adjacent through holes which are concentrically formed, based on the center of the protrusion. The through holes may be arranged such that they are spaced from one another by a predetermined distance in the form of a circular arc with a length corresponding to an angle of 40 to 55 degrees, at a position corresponding to the through holes, based on the center of the current interruptive device.

The safety vent is an element which exhausts gas when the internal pressure of battery increases, thus securing battery safety. For example, when gas is generated inside the battery and the internal pressure thus increases to a critical level or higher, the gas exhausted from the broken region may be exhausted through one or more gas outlets provided on the top cap.

Preferably, the safety vent has a downward recessed center. In such a structure, the downward recess is inverted to an upward recess, is separated from the current interruptive device and interrupts electrical connection, when the internal pressure of batteries increases.

Considering the operation process of the safety vent having such a structure, the gas generated inside the battery passes through the though holes and applies upward pressure to the safety vent, the downward recess of safety vent is inverted at a predetermined pressure (simply referred to as a "first critical pressure") or higher, the protrusion adhered to the recess is separated from the current interruptive device and interrupts application of electricity from the current interruptive device to the safety vent.

The recess includes, for example, an upper bent and a lower bent and the upper bent is preferably provided with a first notch. In conventional methods, a structure in which only the lower bent is cut was suggested. However, the lower bent had a narrow area and was thus unsuitable for efficient gas exhaustion. On the other hand, according to the present invention, a notch for breakage is provided in the upper bent, thus increasing a cut area and enabling rapid discharge of a great amount of gas to the outside.

The first notch may be cut, when the pressure continues to increase and reaches a predetermined level (simply referred to as a "second critical pressure), although the safety vent interrupts current. For this reason, the pressed internal gas is smoothly discharged to the outside through the gas outlet provided on the top cap.

Meanwhile, in order to prevent separation of the overall upper bent from the safety vent, the first notch may have an opening curve in which one side thereof is opened. That is, the opening of one side serves as a bridge to connect the recess of the safety vent to the remaining region thereof.

The size of the first notch is not particularly limited and may preferably correspond to the size of an imaginary line to connect the central lines of the through holes to allow the gas moved upwardly from the current interruptive device to directly apply pressure to the first notch.

Further, the opening region of the first notch has a size preventing the recess from being entirely cut, when the first notch is cut, as mentioned above and preferably has a circular arc length corresponding to an angle of 20 to 50 degrees, more preferably, 25 to 40 degrees, with respect to the center of the safety vent.

In a preferred embodiment, the second notch is formed in the lower bent, but has an opening curved structure in which both ends which face each other open, in order to enable only the upper bent to be cut, when the internal pressure increases. Such a structure in which both ends open prevents the lower bent from being cut and more efficiently induces opening by cutting of the upper bent.

Preferably, the both ends which open in the second notch are formed in a region which does not correspond to the opening region of the first notch. In a more preferred embodiment, the two ends which open in the second notch are formed at an angle of about ±90 degrees.

In a preferred embodiment, the first notch is formed to a depth greater than the second notch so that the first notch is cut prior to the second notch.

The safety vent is not particularly limited and may be made of an aluminum plate material having a thickness of 0.15 to 0.4 mm to provide strength, allowing the notch to be cut, when the internal pressure increases to a critical level or higher.

The cap assembly of the cylindrical battery according to the present invention may further comprise a member such as a positive temperature coefficient (PTC) element to greatly increase battery resistance and thereby interrupt current, when an internal temperature of the battery increases.

The cap assembly has a laminate structure of a current interruptive device, a gasket for a current interruptive device, a safety vent, a PTC element, and a top cap in which one or more gas outlets are formed. A gasket may be further added to the outer periphery of the laminate structure. The PTC element may be interposed between the top cap and the safety vent such that it is adhered to an area provided therebetween.

Further, the gasket for current interruptive device surrounds the periphery of the current interruptive device. In a preferred embodiment, the gasket is provided at the center thereof with an opening. The pressed gas preferably moves in a straight line in order to allow the internal gas to efficiently move upward. Accordingly, the central opening has a shape which does not shield the through hole of the current interruptive device.

In conventional technologies, since the gasket shields a part of the through holes of the current interruptive device, the pressed gas passing through the through holes is intervened by the gasket, as a result, the exhaust amount decreases and the passage varies, thus making it difficult to induce immediate operation of the safety vent. However, as mentioned above, the structure, in which the gasket does not shield the through holes, can secure stability of batteries, since the high-pressure gas entirely directly reaches the safety vent.

In a preferred embodiment, the through hole of the current interruptive device, the central opening of the gasket for the current interruptive device and the notch of the safety vent are formed such that they communicate one another in a straight line.

Accordingly, while the high-pressure gas generated in the battery moves through the through hole of the current interruptive device via the central opening to the notch of the safety vent, the gas passage can maintain a straight line, thus inducing immediate operation of the safety vent and securing battery stability.

In a preferred embodiment, the cylindrical battery may comprise an electrolyte containing an additive (electrolyte additive) to improve thermal stability.

The electrolyte additive may generate gas through successive decomposition reactions of electrolyte with an increase in temperature, and for example, may react at a temperature of 150° C. or higher.

Accordingly, as demonstrated in the following Experimental Example, the cylindrical battery according to the present invention induces successive decomposition reactions of electrolyte with an increase in temperature and thus inhibits thermal runaway and rapid increase in internal pressure of battery. This induction of successive decomposition reaction of electrolyte prevents occurrence of a kind of bottleneck phenomenon, when a great amount of gas is transferred to the safety elements. Accordingly, the electrolyte additive exerts a synergistic effect in cooperation with a specific cap assembly structure.

In a preferred embodiment, the electrolyte additive is a material which causes primary electrolyte decomposition at 150 to 250° C. and secondary electrolyte decomposition at 250 to 300° C. For example, the electrolyte additive causes about ⅔ of the total decomposition reaction in the primary electrolyte decomposition reaction and then causes about ⅓ of the total decomposition reaction in the secondary electrolyte decomposition reaction at a temperature higher than a primary electrolyte decomposition temperature.

Accordingly, gas is successively generated, as temperature increases, thus allowing the current interruptive device and the safety vent to operate. For this reason, the problem associated with generation of a great deal of gas within a short period of time can be solved and the generated gas directly acts via the characteristic cap assembly structure, as mentioned above, in spite of successive gas generation, to induce desired electricity interruption. The gas can be rapidly discharged to the outside of battery by breakage of the safety vent and battery combustion and explosion of can be ultimately efficiently prevented.

A preferred example of the electrolyte additive is fluoroethylene carbonate (FEC), although the present invention is not limited thereto.

The inventors of the present invention confirmed through experiments that, as mentioned above, the electrolyte additive induces successive electrolyte decomposition, as temperature increases and forms a protective film on the surface of a cathode to increase resistance at the cathode interface, and that this increase in resistance decreases the amount of electricity applied upon short circuit, resulting in improved battery stability.

The electrolyte additive is preferably present in an amount of 11 to 40% by weight, more preferably, 15 to 35% by weight, based on the total weight of electrolyte.

When the content of electrolyte additive is excessively small, successive gas generation at a high temperature and current decrease effect upon short circuit cannot be achieved, and on the other hand, when the content of electrolyte additive is excessively large, battery capacity is disadvantageously decreased.

Preferably, the electrolyte additive is used for high-voltage cells, such as at a charge/discharge voltage of 4.3V to 4.35V. In this case, the content of electrolyte additive is preferably 20 to 35% by weight.

An electrolyte generally comprises a lithium salt in a non-aqueous organic solvent, which is known in the art.

As the non-aqueous electrolytic solution that can be used in the present invention, for example, mention may be made of aprotic organic solvents such as N-methyl-2-pyrollidinone, propylene carbonate, ethylene carbonate, butylene carbonate, dimethyl carbonate, diethyl carbonate, gamma-butyrolactone, 1,2-dimethoxy ethane, tetrahydroxy Franc, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate and ethyl propionate. Of these, preferred is a carbonate-based solvent composed of a linear carbonate compound, a cyclic carbonate compound or a combination thereof.

The lithium salt is a material that is readily soluble in the above-mentioned non-aqueous electrolyte and may include, for example, LiCl, LiBr, LiI, LiClO$_4$, LiBF$_4$, LiB$_{10}$Cl$_{10}$, LiPF$_6$, LiCF$_3$SO$_3$, LiCF$_3$CO$_2$, LiAsF$_6$, LiSbF$_6$, LiAlCl$_4$, CH$_3$SO$_3$Li, CF$_3$SO$_3$Li, (CF$_3$SO$_2$)$_2$NLi, chloroborane lithium, lower aliphatic carboxylic acid lithium, lithium tetraphenyl borate and imides.

Additionally, in order to improve charge/discharge characteristics and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride or the like may be added to the non-aqueous electrolyte. If necessary, in order to impart incombustibility, the non-aqueous electrolyte may further include halogen-containing solvents such as carbon tetrachloride and ethylene trifluoride. Further, in order to improve high-temperature storage characteristics, the non-aqueous electrolyte may additionally include carbon dioxide gas and propene sultone (PRS).

The present invention also provides a cap assembly mounted on an opening top of a cylindrical can, in a battery in which an electrode assembly and an electrolyte are provided in a cylindrical can. Specifically, the electrolyte of battery comprises 11 to 40% by weight of an additive to generate a gas through successive electrolyte decomposition with an increase in temperature at a temperature of 150° C. or higher, based on the weight of the electrolyte. For the cap assembly, a plate-type insulating member, which is provided at the center thereof with a perforated opening to allow gas exhaust and connection of electrode terminals and with one or more through holes arranged around the opening, may be mounted on top of the jelly-roll.

In a preferred embodiment, the through hole of the plate-type insulating member may have a position such that it communicates with the central opening of the gasket for current interruptive device and the through hole of the current interruptive device in a straight line. The through holes of the plate-type insulating member have a size of 20 to 50% with respect to the total area of the plate-type insulating member.

Any insulting member may be used without any limitation so long as it is made of an insulating material and for example, may be a polypropylene resin. Of these, particularly preferred is a high-strength polypropylene resin which can exert superior mechanical strength under constant thickness conditions and prevent movement and separation of the jelly-roll when strong external impact is applied.

Advantageous Effects

As apparent from the fore-going, the present invention provides a cylindrical battery which comprises a current interruptive device provided with a plurality of through holes having a relatively large area, thus effectively discharging an internal high-pressure gas. Furthermore, in the case where a notch in which breakage occurs in the safety vent is formed so as to correspond to the through hole, high-pressure gas can be discharged in a straight line, prompt electricity interruption can be induced when high-pressure gas generates, gas exhaust can rapidly occur, and battery safety can be considerably improved.

Furthermore, in the case where a specific electrolyte additive is added to an electrolyte, the additive causes successive electrolyte decomposition, with an increase in temperature to stably generate gas and decreases short circuit current to considerably reduce the possibility of combustion or explosion caused by generation of heat.

BRIEF DESCRIPTION OF THE DRAWINGS

The above and other objects, features and other advantages of the present invention will be more clearly understood from the following detailed description taken in conjunction with the accompanying drawings, in which.

BEST MODE

Now, the present invention will be described in more detail with reference to the annexed drawings and should not be construed as limiting the scope and spirit of the present invention.

Figure 5:
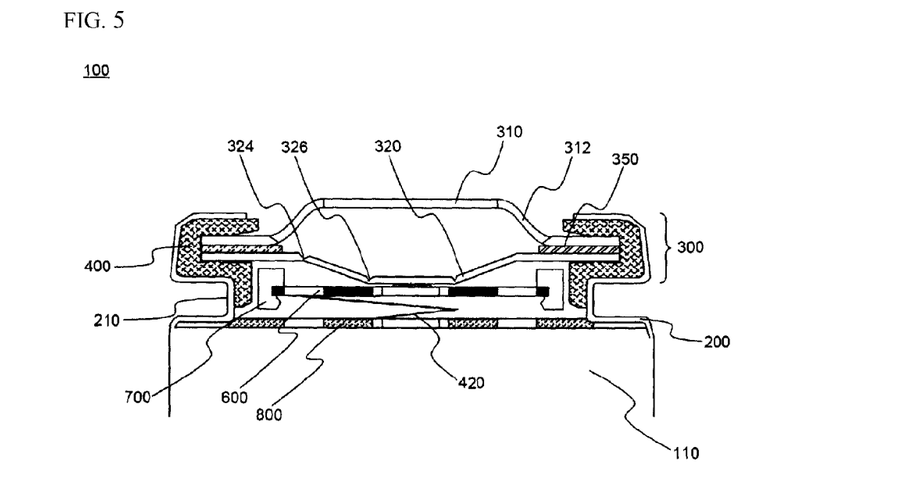
FIG. 5 is a schematic sectional view illustrating a cylindrical battery according to one embodiment of the present invention.
Figure 6:
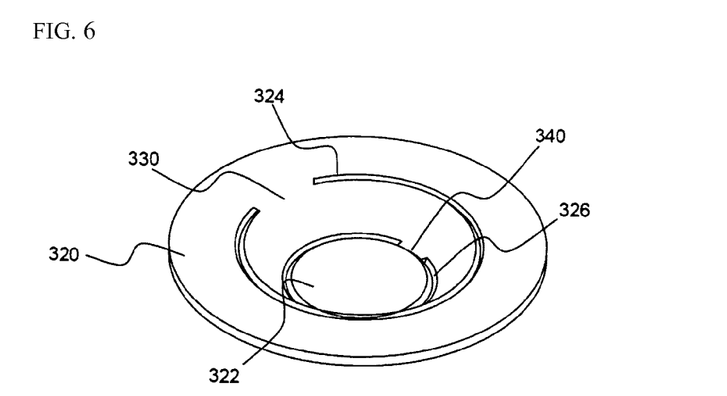
FIGS. 6 and 7 illustrate a perspective view and a plan view of a safety vent used for the cap assembly structure of FIG. 5.
Figure 7:
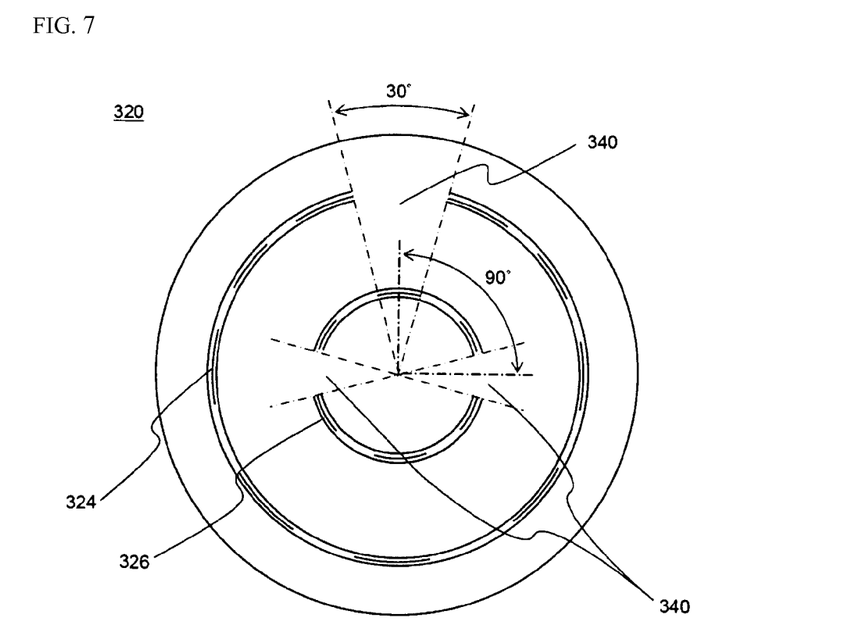

FIG. 5 illustrates a cap assembly structure of a cylindrical battery according to one embodiment of the present invention. FIGS. 6 and 7 are a perspective view and a plan view of a safety vent used for the cap assembly structure of FIG. 5.

Referring to FIG. 5, the cylindrical battery 100 is fabricated by inserting a jelly-roll 110 into a cylindrical can 200, injecting an electrolyte thereto, loading a plate-type insulating member 800 on the top of the jelly-roll 110 and mounting a cap assembly 300 on the opening top of the cylindrical can 200.

The electrolyte contains an additive to minimize generation of heat and induces successive decomposition reaction of the electrolyte.

The cap assembly 300 has a structure in which a top cap 310, a PTC element 350 and a safety vent 320 for reducing an internal pressure are adhered to the inside of a gasket for air-tightness 400 mounted on an upper beading member 210 of the cylindrical can 200.

A current interruptive device 600, which is broken and thus interrupts current, when the internal pressure of battery increases, is connected by welding to the bottom of the safety vent 320, and the gasket for the current interruptive device 700 is surrounded by the periphery of the current interruptive device.

The PTC element 350 is interposed between the top cap 310 and the safety vent 320 such that it is adhered to a current circuit provided therebetween, and greatly increases battery resistance and thereby interrupts current, when an internal temperature of the battery increases. The top cap 310 has a center protruding upward and thus serves as a cathode terminal by connection to an external circuit. A plurality of gas outlets 312 to exhaust pressed gas present in the cylindrical can 200 are formed along the periphery of the protrusion.

The structure of the safety vent 320 in the cap assembly 300 having such a structure will be described with reference to FIGS. 6 and 7 in more detail.

The safety vent 320 has an electrically conductive thin film structure which is provided at the center thereof with a recess 322 which is recessed downwardly, at an upper bent thereof with a first notch 324 and at a lower bent thereof with a second notch 326.

As shown in FIG. 7 illustrating the plan view of the safety vent 320, and the first notch 324 arranged on the upper bent has an opening curve in which one side thereof is open. This opening region is a non-notch region 330, which prevents separation of the entirety of the first notch, although the region in which the notch is formed by the high-pressure gas is cut.

Further, the second notch 326 is formed in the lower bent and has an opening curve structure in which both ends which face each other open. Two non-notch regions 340 are arranged on both open ends of the second notch 326. The non-notch regions 340 prevent separation of the second notch 326 by cutting. In order to more accurately prevent separation of the second notch 326, the non-notch regions 340 are preferably arranged in a region which does not correspond to the non-notch region 330 formed in the first notch 324, more preferably, as shown in the drawing, the non-notch regions 340 are formed at an angle of about ±90 degrees, based on the central line of the non-notch region 330 of the first notch 324 and two non-notch regions 340 may be arranged such that they face each other.

Figure 8:
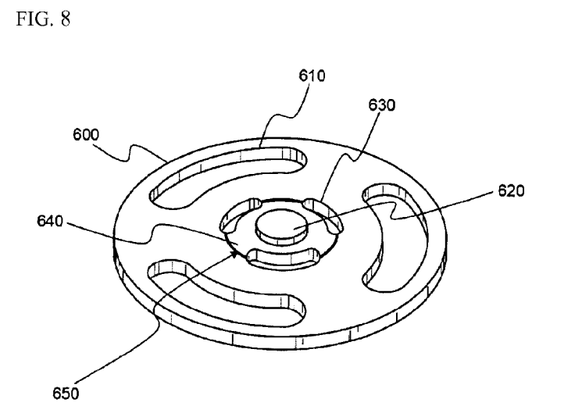
FIGS. 8 and 9 are a perspective view and a plan view illustrating a current interruptive device used for the cylindrical battery of FIG. 5.
Figure 9:
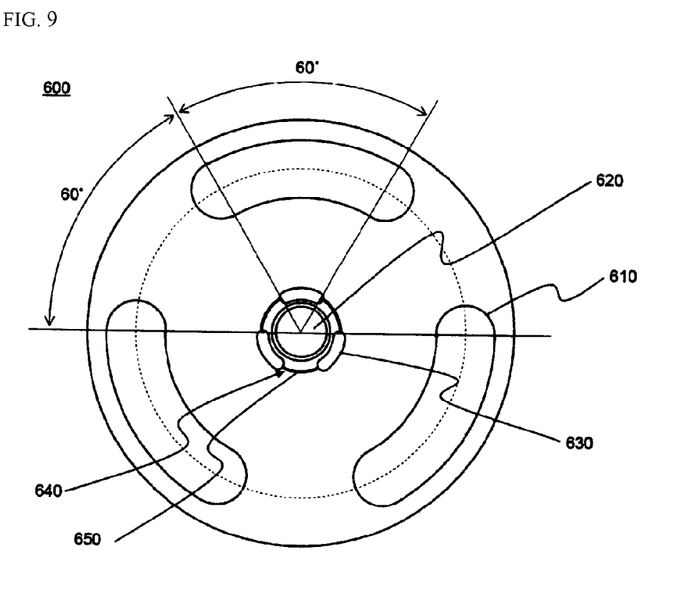

FIGS. 8 and 9 illustrate a current interruptive device 600 used for the cylindrical battery of FIG. 5.

Referring to FIGS. 8 and 9, together with FIG. 5, a protrusion 620, which protrudes upwardly, adhered by welding to the recess bottom (322; see FIG. 6) of a safety vent 320, is formed at the center of the current interruptive device 600, and a cathode lead 420 connected to the cathode of the jelly-roll 110 is electrically connected to a region other than the protrusion 620 on the bottom of the current interruptive device 600.

The protrusion 620 is provided with a bridge 640, provided with three through holes 630 and a notch 650 to connect the adjacent through holes 630 which are concentrically formed, based on the center of the protrusion 620.

Further, three through holes 610 for gas exhaust are formed in the form of a circular arc at a radially symmetrical position based on the central axis, on the periphery of the current interruptive device 600. The through holes 610 have a size of 30% with respect to the total area of the current interruptive device 600 and increase exhaust amount of the high-pressure gas present inside the battery and thus can exert reliable current interruption. The through holes 610 are spaced from one another at an angle of about 120 degrees, have the same shape and size and the distance therebetween is substantially uniform. Based on such a structure, the current interruptive device 600 maximizes gas exhaust and maintains high mechanical strength.

At this time, preferably, the size of an imaginary line (see a dot line) to connect the central lines of the through holes 610 is substantially equivalent to the size of the first notch 324 of the safety vent (320; see FIGS. 6 and 7). Accordingly, when a predetermined level or higher of internal pressure is generated, the high-pressure gas passing through the through holes 610 press the first notch 324 via a straight line passage and facilitate cutting of the first notch 324, thus enabling rapid gas exhaust.

Figure 10:
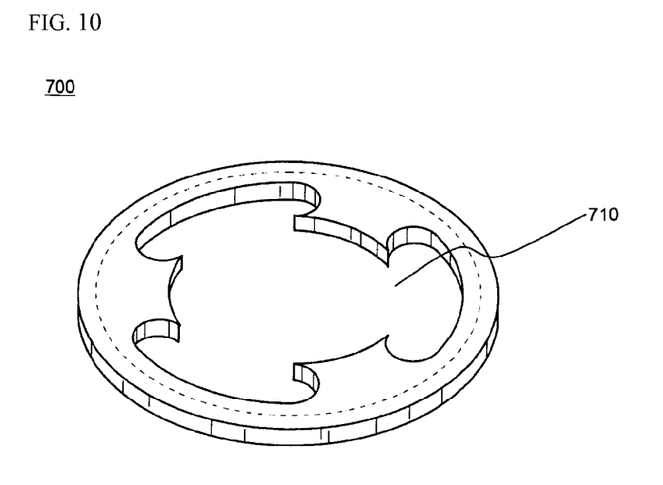
FIGS. 10 and 11 are a perspective view and a plan view illustrating a gasket for current interruptive device used for the cylindrical battery of FIG. 5.
Figure 11:
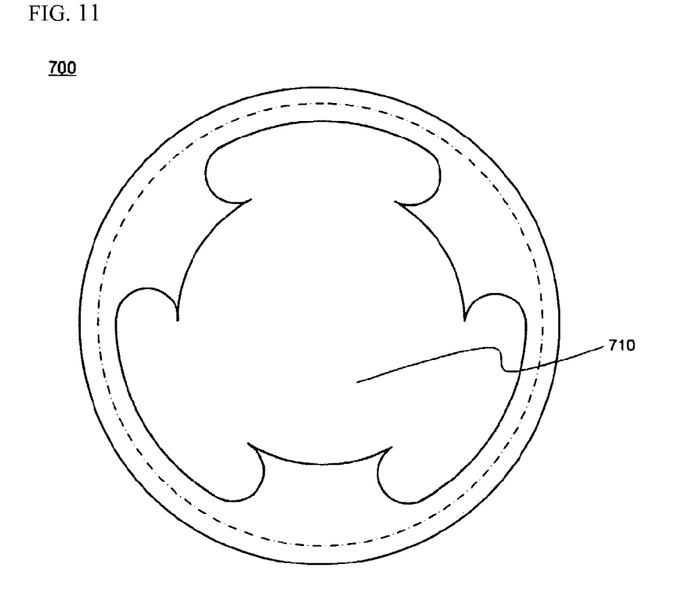

FIGS. 10 and 11 illustrate a gasket for current interruptive device 700 surrounding the current interruptive device 600.

For convenient illustration, the gasket for current interruptive device is briefly illustrated in order to represent only the shape of the opening.

Referring to FIGS. 10 and 11, together with FIG. 5, the gasket for current interruptive device 700 is provided at the center thereof with an opening 710 and the central opening 710 has a shape which does not shield the through holes 610 of the current interruptive device 600. That is, the shape of the gasket for the current interruptive device 700 substantially corresponds to the shape of the periphery of a region in which an opening is not formed in the current interruptive device 600, and thus surrounds the periphery of the current interruptive device 600 and does not shield the through holes 610, thereby securing the through hole 610 to serve as a gas exhaust.

Figure 12:
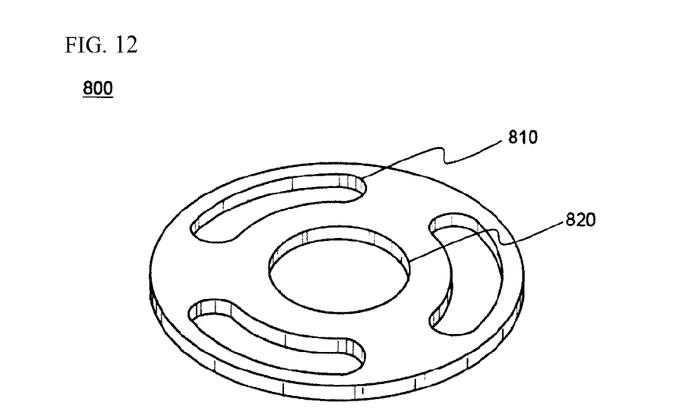
FIGS. 12 and 13 are a perspective view and a plan view illustrating a plate-type insulating member used for the cylindrical battery of FIG. 5.
Figure 13:
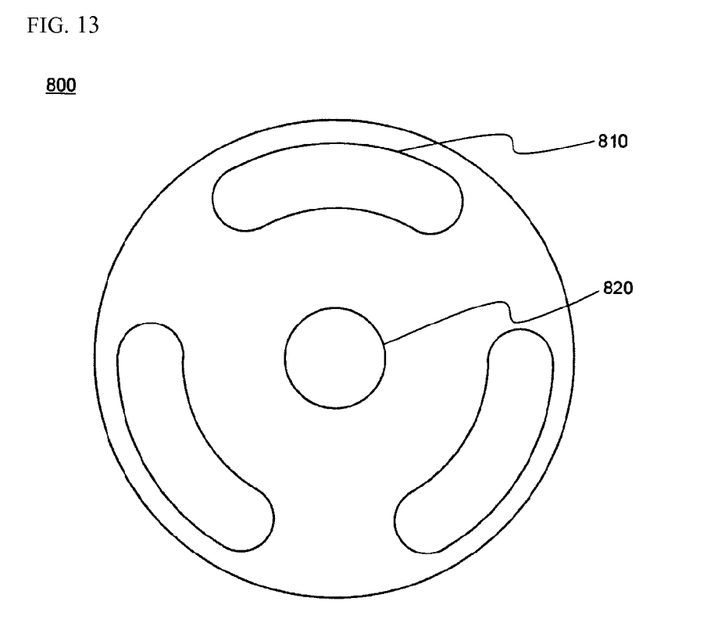

Meanwhile, FIGS. 12 and 13 illustrate an example of a plate-type insulating member 800 mounted on the top of the jelly-roll 110 in the symmetrical battery 100 according to FIG. 5. Referring to these drawings, together with FIG. 2, the plate-type insulating member 800 is provided at the center thereof with a perforated opening 820 to allow gas exhaust and connection of electrode terminals and with one or more through holes 810 arranged around the opening 820. The through holes 810 of the plate-type insulating member 800 may be formed with the shape, size and position corresponding to the through holes 610 of the current interruptive device 600 and have a size of 30% with respect to the total area of the plate-type insulating member 800.

Figure 14:
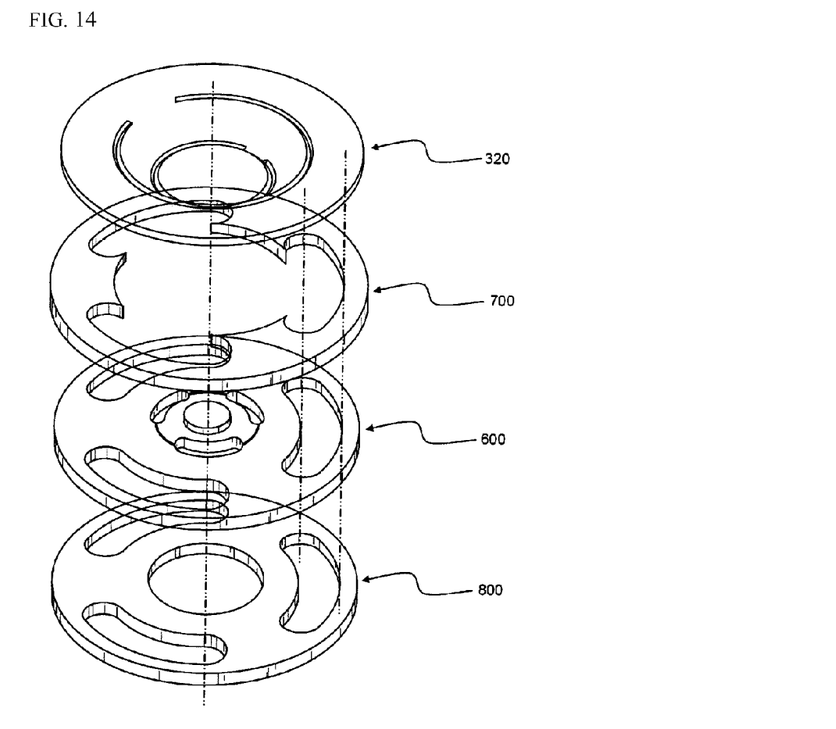
FIG. 14 is a schematic view illustrating a process for laminating a plate-type insulating member, a gasket for a current interruptive device and a current interruptive device according to one embodiment of the present invention.

FIG. 14 schematically illustrates a laminate in which a plate-type insulating member 800, a gasket for a current interruptive device 700, a current interruptive device 600 and a safety vent 320 are mounted on a cylindrical can in this order.

Referring to FIG. 14, together with FIGS. 2 to 6 illustrated above, the through hole 810 of the plate-type insulating member 800, the central opening 710 of the gasket for current interruptive device 700, the through hole 610 of the current interruptive device 600 and the first notch 324 of the safety vent 320 are formed such that they communicate with one another in a straight line, in order to allow the pressed gas inside the battery to be efficiently exhausted to the outside.

Figure 15:
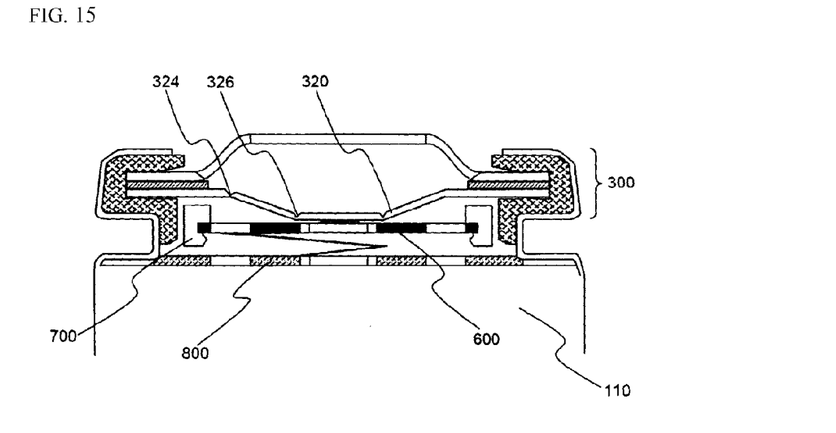
FIGS. 15 to 17 are cross-sectional views illustrating a series of processes in which current is interrupted and high-pressure gas is discharged by operation of a safety element in the cylindrical battery of FIG. 5.
Figure 16:
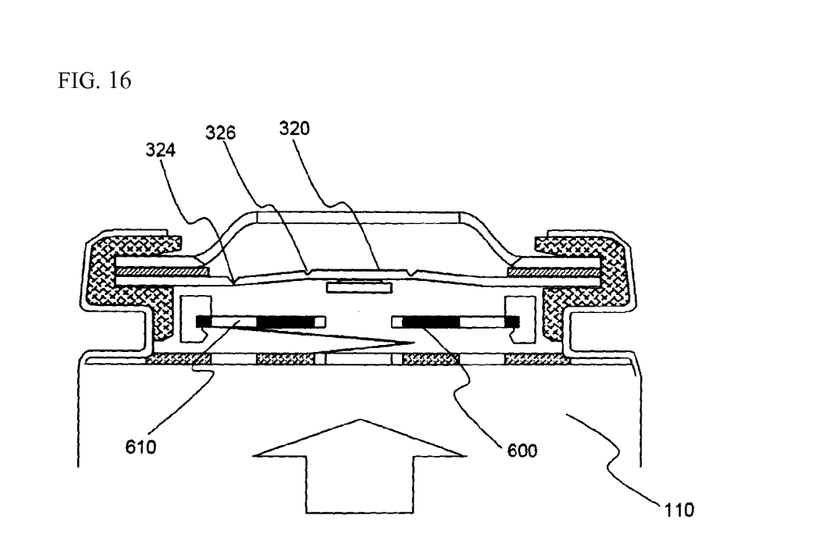
Figure 17:
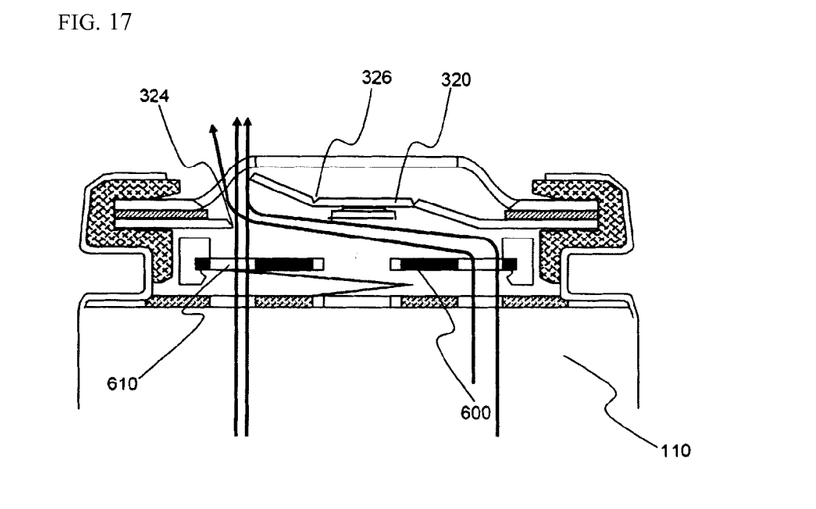

FIGS. 15 to 17 schematically illustrate a process in which gas is exhausted, in the case where the internal pressure of battery abnormally increases.

Referring to the drawings, when the internal pressure of battery abnormally increases, the pressed gas passes through the through hole 610 of the current interruptive device 600 and the through hole 630 and applies upward pressure to the safety vent 320.

Such a pressure causes the downward recess 322 of the safety vent to rise, while simultaneously causing separation of the protrusion 620 welded to the downward recess 322 from the current interruptive device 600 at a first critical pressure or higher, thus interrupting application of electricity from the current interruptive device 600 to the safety vent 320, as shown in FIG. 16.

In spite of such current-blocking, if the pressure continues to increase and then reaches a second critical pressure or higher, the first notch 324 of the safety vent 320 ruptures, and at the same time, the internal pressed gas is exhausted to the outside through the gas outlet 312, as shown in FIG. 17.

The case in which the first notch 324 having a large diameter is cut according to the present invention, exhibits a greater gas exhaust amount, as compared to the case where the second notch having a small diameter is cut, thus inducing rapid exhaust of high-pressure gas.

Now, the present invention will be described in more detail with reference to the following Examples. These examples are provided only for illustrating the present invention and should not be construed as limiting the scope and spirit of the present invention.

Example 1

A cylindrical secondary battery was fabricated in the following manner.

1-1 Fabrication of Cathode and Anode

A cathode active material containing $LiCoO_2$ was applied to an aluminum current collector and a cathode tap was adhered to the end of the current collector such that the cathode tap protrudes upwardly, to fabricate a cathode. An anode active material containing artificial graphite was applied to a copper current collector and an anode tap was adhered to the end of the anode collector such that the anode tap protrudes upwardly, to fabricate an anode.

1-2. Preparation of Electrolyte

An electrolyte for lithium secondary batteries was prepared by adding 11% by weight of fluoroethylene carbonate as an additive, based on the total weight of an electrolyte, to a non-aqueous solvent containing 1.0M $LiPF_6$ as the electrolyte and consisting of ethylene carbonate (EC)/propylene carbonate (PC)/dimethyl carbonate (DMC)=30/5/65 (volume ratio).

1-3 Rolling of Laminate Using Center Pin

A sheet-type laminate in which a separator is interposed between the cathode and anode obtained in section 1-1 was inserted into a center pin, and then rolled to a stress of 350 $g/cm^2$ to manufacture a jelly-roll.

The jelly-roll thus manufactured was placed in a cylindrical case, connected to a lead wire and the electrolyte prepared in section of 1-2 was inserted thereinto.

1-4 Fabrication of Cylindrical Secondary Battery

A first notch with a diameter of 8.0 mm and a thickness of 0.06 mm was formed in a region other than a circular arc having an angle of 30 degrees on an aluminum plate material with an outer diameter of 16 mm and a thickness of 0.3 mm, as shown in FIG. 7, and a safety vent provided with a recess which protrudes downwardly to a depth of 0.65 mm was manufactured.

Further, three through holes were radially formed on an aluminum plate material with an outer diameter of 11 mm and a thickness of 0.5 mm such that the total area of the through holes is about 30% with respect to the total area of the plate material, as shown in FIG. 9. Then, a protrusion with a diameter of 1.53 mm and a height of 0.20 mm was formed at the center thereof, three through holes with a width of 0.6 mm and a circumferential length of 2.61 mm are perforated at a distance of 1.5 mm from the center of the central protrusion, and a notch with a thickness of about 70 μm was formed at respective bridges to connect the through holes to manufacture a current interruptive device.

Further, a gasket for current interruptive device which does not shield the through hole of the current interruptive device was manufactured on a polypropylene plate material with an outer diameter of 12 mm and a thickness of 0.5 mm, as shown in FIG. 11.

The outer periphery of the current interruptive device was inserted into the gasket for the current interruptive device, and the bottom of the bent of the safety vent was adhered by laser welding to the top of the protrusion of the current interruptive device.

The plate-type insulating member was mounted on the opening top of the cylindrical case of 1-3, the top of the can was fixed by beading, the safety vent provided with the current interruptive device and the gasket, in which the PTC element and the top cap are inserted, were inserted into the beading portion, and the gasket was clamped by pressing the top of the can inwardly to fabricate a battery.

Example 2

A battery was fabricated in the same manner as in Example 1 except that the thickness of the first notch was 0.1 mm and the thickness of the second notch was 0.06 mm in the process of manufacturing the safety vent.

Example 3

A battery was fabricated in the same manner as in Example 1 except that the thickness of the first notch was 7 mm and the thickness of the second notch was 0.06 mm in the process of manufacturing the safety vent.

Example 4

A battery was fabricated in the same manner as in Example 1 except that fluoroethylene carbonate was contained in an amount of 20% by weight, based the total weight of the electrolyte in the process of preparing the electrolyte.

Example 5

A battery was fabricated in the same manner as in Example 1 except that fluoroethylene carbonate was contained in an amount of 30% by weight, based the total weight of the electrolyte, in the process of preparing the electrolyte.

Example 6

A battery was fabricated in the same manner as in Example 4 except that a non-aqueous solvent composed of propylene carbonate (PC) and methyl propionate (MP) in a volume ratio of 8:92 was used in the preparation of the electrolyte.

Example 7

A battery was fabricated in the same manner as in Example 4 except that a non-aqueous solvent composed of propylene carbonate (PC) and methyl propionate (MP) in a volume ratio of 8:92 was used in the preparation of the electrolyte.

Comparative Example 1

A pouch-type mono-cell was fabricated in the same manner as in Example 1 except that an additive was not added in the preparation of the electrolyte.

Comparative Example 2

A battery was fabricated in the same manner as in Example 1 except that fluoroethylene carbonate was contained in an amount of 5% by weight, based the total weight of the electrolyte in the process of preparing the electrolyte.

Comparative Example 3

A battery was fabricated in the same manner as in Example 1 except that the total area of the current interruptive device was 18%, with respect to the total area of the current interruptive device.

Experimental Example 1

The batteries fabricated in Examples 1, 4 and 5 and Comparative Examples 1 and 2 were prepared and cathode interface resistance thereof was measured. The results are shown in FIG. 18.

Figure 18:
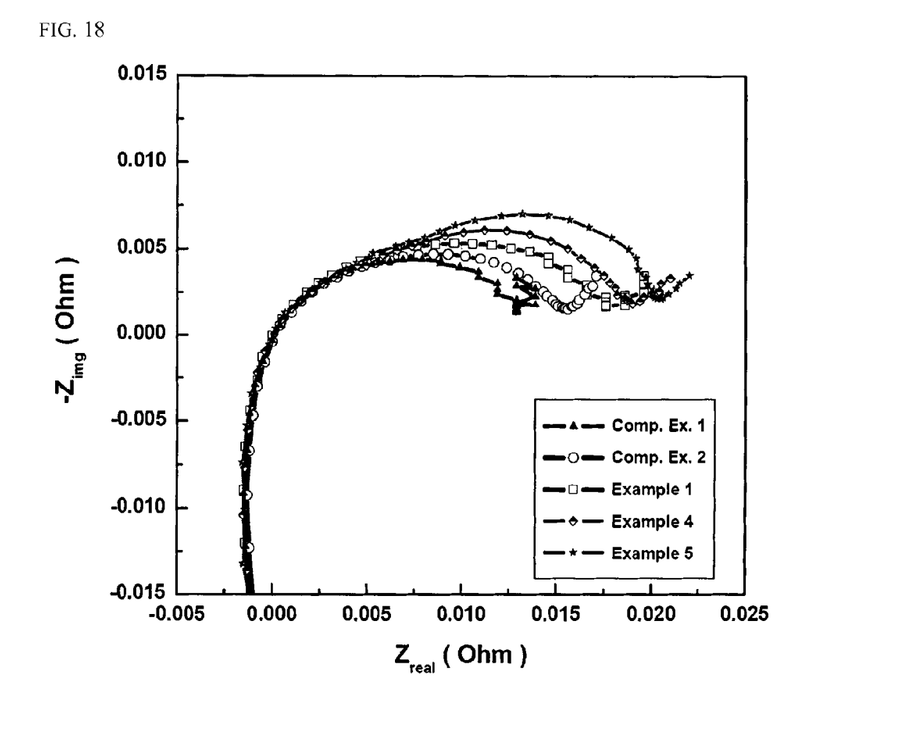
FIG. 18 is a graph showing cathode interface resistance results of the batteries fabricated in Examples 1, 4 and 5 and Comparative Examples 1 and 2.

Referring to FIG. 18, resistance per frequency was measured using an electrochemical impedance spectroscopy (EIS) apparatus and the resulting behavior was converted to a semi-circle and shown in a graph. It can be seen that the battery of Example 1 in which fluoroethylene carbonate is added to an electrolyte, exhibited a relative increase in resistance, as compared to the battery in which the additive is not added (Comparative Example 1) and the battery containing 5% by weight of the additive (Comparative Example 2). In particular, it can be seen that the battery containing 20% by weight of the additive (Example 4) and the battery containing 30% by weight of the additive (Example 5) exhibited a considerable increase in cathode interface resistance.

Experimental Example 2

Two of each of the batteries fabricated in Examples 1, 4 to 7, and Comparative Examples 1 and 2 were prepared, external short circuit was induced in fully charged batteries and the circuit current thereof was measured. The results thus obtained are shown in Table 1.

TABLE 1

| | (unit: current (A)) | | |
| --- | --- | --- | --- |
| | 1 | 2 | Avg. |
| Ex. 1 | 46.8 | 50 | 48.4 |
| Ex. 4 | 44.5 | 45.8 | 45.2 |
| Ex. 5 | 40.9 | 43.2 | 42.0 |
| Ex. 6 | 45.3 | 45.6 | 45.4 |
| Ex. 7 | 43.9 | 42.1 | 43.0 |
| Comp. Ex. 1 | 51.2 | 53.6 | 52.4 |
| Comp. Ex. 2 | 51 | 52 | 51.5 |

As can be seen from Table 1 above, the battery of Example 1 in which fluoroethylene carbonate is added to the electrolyte, exhibited low current upon short circuit, as compared to the battery of Comparative Example 1 in which an additive is not added to the electrolyte and the battery of Comparative Example 2 in which 5% by weight of an additive is added to the electrolyte.

Furthermore, the battery of Example 4 containing 20% by weight of an additive and the battery of Example 5 containing 30% by weight of an additive, exhibited considerably low short circuit current, as compared to the battery of Example 1 containing 11% by weight of an additive. This behavior is similarly shown in Examples 6 and 7 which have different non-aqueous electrolyte compositions than Examples 4 and 5.

Accordingly, taking into consideration the fact that heat generated upon short circuit increases in proportion to current amount, the batteries according to the present invention is relatively stable due to low amount of generated heat.

Experimental Example 3

The batteries fabricated in Examples 1, and 4 to 7 were compared with the batteries of Comparative Examples 1 and 2 in terms of thermal stability. The results thus obtained are shown in Table 1 below.

TABLE 2

|  | Onset temp. (°C.) | Heat capacity (J/g) | | | |
|---|---|---|---|---|---|
|  |  | 1 peak | 2 peak | 3 peak | Total |
| Ex. 1 | 206 ± 1 | 71 ± 4 | 47 ± 4 | — | 118 ± 6 |
| Ex. 4 | 202 ± 1 | 55 ± 3 | 45 ± 5 | — | 100 ± 6 |
| Ex. 5 | 204 ± 1 | 50 ± 4 | 40 ± 4 | — | 90 ± 4 |
| Ex. 6 | 203 ± 1 | 53 ± 2 | 50 ± 4 | — | 103 ± 4 |
| Ex. 7 | 205 ± 1 | 48 ± 5 | 43 ± 5 | — | 91 ± 6 |
| Comp. Ex. 1 | 198 ± 1 |  | 223 ± 6 |  | 223 ± 6 |
| Comp. Ex. 2 | 204 ± 1 | 98 ± 11 | 56 ± 5 | 49 ± 6 | 203 ± 6 |

"Onset temp." in Table 2 above represents an initial temperature of thermal decomposition and "heat capacity" represents a peak area upon thermal analysis. Thermal stability was evaluated by comparing these values.

As can be seen from the experiment, electrolyte decomposition was induced once at about 210° C. in the battery of Comparative Example 1 containing no fluoroethylene carbonate, while electrolyte decomposition was induced twice at about 225° C. and 275° C. in the battery of Example 1 containing fluoroethylene carbonate. Accordingly, it can be seen that the concentration of gas generation at one time was inhibited.

Further, as can be seen from Table 2, the battery of Example 1 exhibited a specific heat capacity equal to about 50% that of the battery of Comparative Example 1, which indicated that the safety problem by high heat generation was less serious. In particular, the batteries of Examples 4 and 5 containing 20% by weight and 30% by weight of an electrolyte additive, respectively, exhibited considerably low specific heat capacity, as compared to the battery of Example 1, which indicates that the batteries of Examples 4 and 5 exhibited superior stability. This phenomenon of considerable decrease in generated heat is shown in Examples 6 and 7 using a non-aqueous electrolyte with a composition of PC/MP.

Meanwhile, the battery of Comparative Example 2 containing 5% by weight of an electrolyte additive exhibited a 70% or more increase in specific heat capacity, as compared to the battery of Example 1 containing 11% by weight of an electrolyte additive. This means that, when fluoroethylene carbonate is present in an amount of less than 10% by weight, although added, the effects obtained by addition are considerably low.

Experimental Example 4

The batteries fabricated in Examples 1 and 3 and Comparative Example 3 were nail tested. The results thus obtained are shown in Table 3 below.

TABLE 3

|  | Area ratio of through hole | Cut region of safety vent | Explosion | Deformation Of battery can |
|---|---|---|---|---|
| Ex. 1 | 30% | First notch | X | X |
| Ex. 2 | 30% | Second notch | X | Δ |
| Ex. 3 | 30% | Internal notch (increased diameter) | X | Δ |
| Comp. Ex. 3 | 18% | First notch | ○ | ○ |

As can be seen from Table 3 above, when the current interruptive device having a through hole area ratio of 30% is used, neither battery explosion not deformation occurred. On the other hand, the battery of Comparative Example 3 using the current interruptive device having a through hole area ratio of 30% was exploded during the nail test. Further, as shown in Examples 2 and 3, in the case where the second notch was cut and gas was not smoothly exhausted from the safety vent, the battery was not exploded, but the battery can was deformed.

It was seen that, in high-capacity batteries, in the case where the sizes of the cut portion of the safety vent and the through hole of the current interruptive device are not sufficient, gas could not sufficiently pass through these elements. Further, it was seen that, in the case of the second notch in which the cut portion of the safety vent is arranged inside of the battery, resistance to gas exhaustion may be disadvantageously generated by the inclined internal notch of the safety vent after cutting, although the diameter of the notch is widened.

As apparent from the afore-going, the area of the through hole of the current interruptive device increases and the structure using the cut portion of the safety vent as the first notch exerts improvement effects of battery stability in order to effectively discharge the gas from the battery.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A cylindrical battery comprising:
(a) an electrode assembly and an electrolyte in a cylindrical can, the electrode assembly having a cathode, anode, and separator rolled together;
(b) a cap assembly mounted on the opening top of the cylindrical can, said cap assembly comprises:
a safety vent, which breaks under increased pressure,
wherein the safety vent has a recess located in a center of the safety vent, said recess having an upper bend and a lower bend,
said upper bend has a first notch,
wherein said first notch has a first arcuate shape region and a first non-notched region, and
said lower bend has a second notch,
wherein the second notch has a second arcuate shaped region, a third arcuate shaped region, a second non-notched region, and a third non-notched region, wherein said second non-notched region and said third non-notched region are located diametrically opposite to one another;
a current interruptive device, which upon activation interrupts current,
wherein the current interruptive device includes:
a protrusion protruding upwardly, said protrusion welded to the bottom of a recess of the safety vent, said protrusion provided at a center of the current interruptive device,
a cathode lead connected to the cathode through the bottom of the current interruptive device in a region other than the protrusion; and
a bridge, provided with first through holes and a third notch, said third notch connecting the adjacent first through holes,
wherein said first through holes and said third notch concentrically surround the center of the protrusion, two or more second through holes to allow exhaustion of gas,
wherein the second through holes have a total area of 20 to 50% with respect to the total area of the current interruptive device,
wherein the second through holes are arranged such that the second through holes are spaced from one another by a distance in the form of a circular arc with a length corresponding to an angle of 50 to 80 degrees, based on the center of the current interruptive device; and (c) a gasket surrounding the periphery of the current interruptive device.

2. The cylindrical battery according to claim 1, wherein the second through holes have a total area of 30 to 40%, with respect to the total area of the current interruptive device.

3. The cylindrical battery according to claim 1, wherein the first through holes are formed in the form of a circular arc at a radially symmetrical position, based on the center of the current interruptive device.

4. The cylindrical battery according to claim 1, wherein the first through holes are arranged such that they are spaced from one another by a distance in the form of a circular arc with a length corresponding to an angle of 40 to 55 degrees, based on the center of the current interruptive device.

5. The cylindrical battery according to claim 1, wherein the first notch overlies the first through holes.

6. The cylindrical battery according to claim 1, wherein the opening region of the first notch has a circular arc length corresponding to an angle of 20 to 50 degrees, with respect to the center of the safety vent, to prevent the recess from being entirely cut, when the first notch is cut.

7. The cylindrical battery according to claim 1, wherein neither of the non-notched regions of the second notch are aligned with the non-notched region of the first notch.

8. The cylindrical battery according to claim 1, wherein the cap assembly has a laminate structure of a current interruptive device, a gasket for a current interruptive device, a safety vent, a PTC element, and a top cap in which one or more gas outlets are formed, and
wherein a can gasket is mounted on the outer periphery of the laminate structure.

9. The cylindrical battery according to claim 1, wherein the gasket for the current interruptive device is provided at the center thereof with an opening, and the opening communicates with the second through holes of the current interruptive device.

10. The cylindrical battery according to claim 9, wherein the second through holes of the current interruptive device, the central opening of the gasket for current interruptive device and the notch of the safety vent are formed such that they communicate with one another perpendicularly in a straight line.

11. The cylindrical battery according to claim 1, wherein the cylindrical battery comprises an electrolyte containing an electrolyte additive, which improves thermal stability.

12. The cylindrical battery according to claim 11, wherein the electrolyte additive causes successive electrolyte decomposition with an increase in temperature at a temperature of 150° C. or higher, to generate gas.

13. The cylindrical battery according to claim 12, wherein the electrolyte additive is a material which causes primary electrolyte decomposition at 150 to 250° C. and secondary electrolyte decomposition at 250 to 300° C.

14. The cylindrical battery according to claim 12, wherein the electrolyte additive is fluoroethylene carbonate.

15. The cylindrical battery according to claim 11, wherein the electrolyte additive is present in an amount of 11 to 40% by weight, based on the total weight of electrolyte.

16. The cylindrical battery according to claim 11, wherein the electrolyte additive is present in an amount of 15 to 35% by weight, based on the total weight of electrolyte.

* * * * *